July 24, 1956  W. H. REINHOLZ  2,755,841
BABY WALKER
Filed May 25, 1953

INVENTOR
WILLIAM H. REINHOLZ
BY
*Noon Graham*
ATTORNEYS

United States Patent Office 2,755,841
Patented July 24, 1956

2,755,841

BABY WALKER

William H. Reinholz, Pasadena, Calif.

Application May 25, 1953, Serial No. 357,039

2 Claims. (Cl. 155—23)

This invention has to do with vehicles known as baby walkers and has for an object the provision of a baby walker which has novel means for retaining it within a given area while permitting a child-occupant to walk in a circle about said area.

Another object is to provide a baby walker which may be produced with great economy, which is extremely light in weight and which may be shipped in fully knocked-down condition and readily assembled.

Another object is to provide a baby walker so designed and constructed that a child may bounce in the seat.

Other objects and advantages will become apparent from the following description of a presently preferred embodiment, for which purpose I shall refer to the accompanying drawings, wherein.

Figure 1:
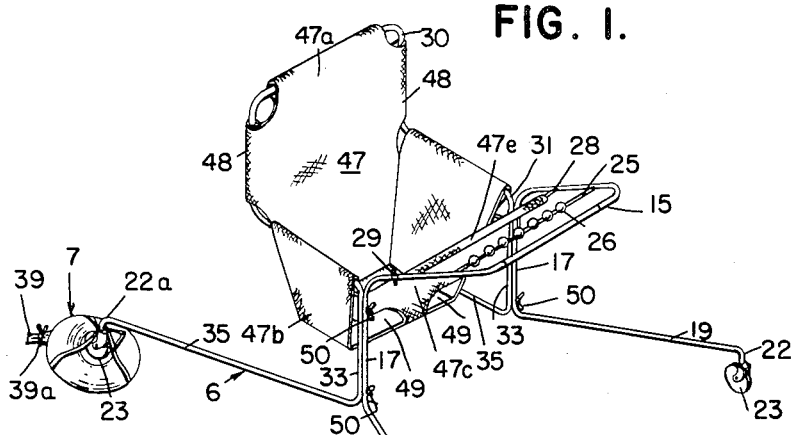
Fig. 1 is a perspective view of my baby walker.
Figure 4:
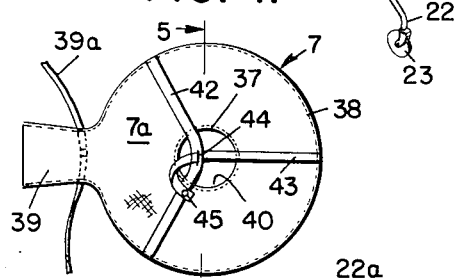
Fig. 4 is a plan view of the anchor member.
Figure 5:
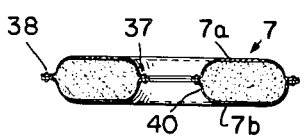
Fig. 5 is a cross sectional view taken on line 5—5 of Fig. 4.

With reference now to the drawings, I show a pair of oppositely disposed frames generally denoted 5, 6, respectively, and an anchor element 7.

Front frame 5 comprises a U-shaped top portion 15 whose ends terminate in vertically depending straight parallel intermediate portions 17. Each of the portions 17 then terminates at its bottom end in a forwardly extending, resilient leg 19, the respective legs diverging towards their outer ends and each terminating in a vertically disposed extension 22 carrying a conventional caster 23.

The U-shaped top portion 15 extends upwardly and forwardly from the intermediate portions 17 and may appropriately carry a crossbar 25 slidably supporting balls 26 by which a child occupying the device may amuse itself. A reinforcing and seat-retaining crossbar 28 also extends between the sides of the portion 15 and passes therethrough, one end, not shown, of the bar 28 being headed and the other end being threaded to receive a wingnut 29.

The rear frame 6 comprises an uprightly disposed U-shaped top portion 30 whose sides terminate in horizontally, forwardly disposed, resilient extensions providing arm rests 31. Arm rests 31 have depending parallel extensions 33 forming what I call intermediate portions. The portions 33, in turn, have leg extensions 35 which extend downwardly, rearwardly and outwardly in divergent relationship, each terminating in a vertically disposed portion 22a carrying a conventional caster 23.

In order to provide an anchor which permits a child-occupant to propel the device about a circle, but which prevents the device from moving otherwise than in such circular path, I provide a circular or ring-shaped fabric sack 7 which preferably comprises opposite sides 7a, 7b stitched together at 37, 38, and having a filling neck 39 which may be closed as by a string 39a. The sack 7 defines a central opening 40 within which one of the portions 22 or 22a and one of the casters 23 is disposed to rest against the floor or ground. Flexible straps 42, 43 are provided on the sack to releasably secure it to a leg of the device. In the preferred form shown, strap 42 is secured at its end to the periphery of the sack, has a medial hole 44 and a fastener 45, such as a button. Strap 43 is fixed at one end to the periphery of the sack and then extends through the hole 44, after which it is looped around one of the leg extensions 22 and secured to the fastener 45. It will be understood, of course, that the sack does not necessarily have to be circular in shape, but may be square or oval so long as it has the opening 40 to permit a caster to rest on the floor or ground and yet to prevent lateral escape of the caster from the opening.

When in use, the sack may be filled with sand or some other granular and sufficiently heavy material, but when being shipped or transported and not in use the sack may be emptied, collapsed and folded up as any other piece of fabric.

The occupant-support 47 comprises a sheet of fabric having sleeve-like edge portions 48 through which the frame elements extend. The support has a backrest portion 47a, a seat portion 47b, and a front extension 47c, the latter having a sleeved end 47e through which crossbar 28 extends. Front extension 47c has leg-passing recesses 49.

The intermediate portions 17 of frame 5 are secured to the intermediate portions 33 of frame 6, as by screws and wingnuts 50. Said intermediate portions are of a length at least equal to the distance between the bottom of the seat portion 47b and the arm rests. Leg portions 19 extend substantially horizontally or at a relatively small angle—of the order of preferably not exceeding 10° to the horizontal—to render the light weight of a child-occupant to readily flex them by bouncing up and down in the seat.

Figure 2:
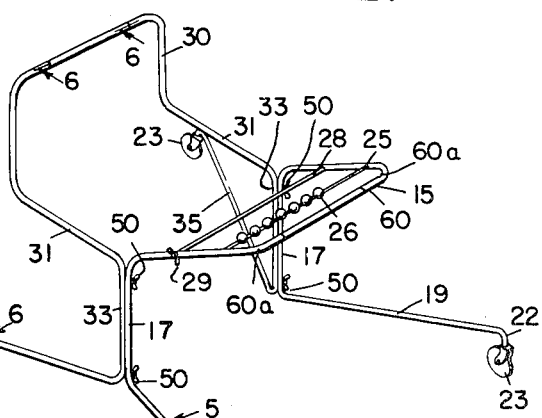
Fig. 2 is a view similar to Fig. 1 with the occupant-support and anchor removed for illustrative purposes.
Figure 3:
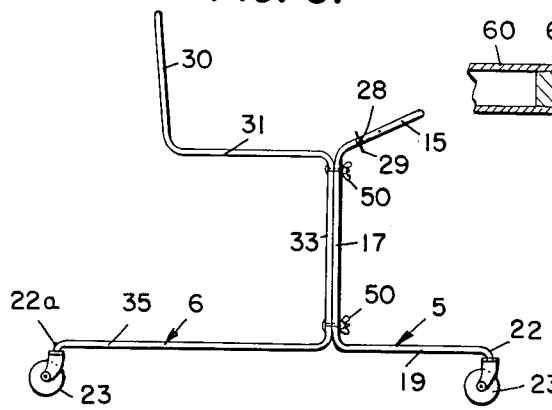
Fig. 3 is a side elevation.
Figure 6:
Fig. 6 is an enlarged fragmentary sectional view taken on line 6—6 of Fig. 2.

It is my preference to make each of the frames 5 and 6 in three sections, as best shown in Figs. 2 and 6; that is, the crossarm 60 of the U-shaped portion of each frame is tubular and is cut off adjacent the curve 60a, and the registering ends 62, 63 of each frame are held together by an intermediate member 64 having somewhat tapered ends 65 frictionally fitted into the ends 62, 63.

It will be apparent that the device may be shipped or transported in knocked-down position and quickly assembled or reassembled at point of use. Inasmuch as the anchor member 7 may be emptied of its weight-producing material when not in use, it adds little, if any, to the shipping weight. When it is desired to use the device, it is only necessary to fill the anchor sack through the filling opening 39, then rest one of the casters against the floor in the central opening 40. While it may not always be necessary to tie the anchor member to the leg of the vehicle by the straps 42, 43, since it is difficult for the caster to escape laterally from the central opening 40, nevertheless, when desired, the anchor may be readily secured to the leg of the vehicle by the straps 42, 43.

I claim:

1. A baby walker comprising a front frame and a rear frame disposed in opposed relationship, said front frame having a forwardly disposed, U-shaped top portion, laterally outwardly and forwardly disposed resilient leg portions, each terminating in a substantially vertical end extension, and straight, elongated, vertically disposed intermediate portions between said leg and top portions; and said rear frame comprising an uprightly disposed, inverted, U-shaped top portion defining a back rest, horizontally, forwardly disposed resilient portions defining arm rests, laterally outwardly and rearwardly disposed resilient leg portions, and elongated, vertically disposed straight intermediate portions, a fabric occupant-support having sleeve-like portions mounted on the last-named U-shaped portion and said arm rests, casters mounted on the free ends of the end extensions of said respective leg portions, means securing together in parallel relationship the said vertically disposed intermediate portions, and a ring-shaped anchor member surrounding one of the end extensions of one of said leg portions.

2. A baby walker comprising a front frame and a rear frame disposed in opposed relationship, said front frame having a forwardly disposed, U-shaped top portion, laterally outwardly and forwardly disposed resilient leg portions, each terminating in a substantially vertical end extension, and straight, elongated, vertically disposed intermediate portions between said leg and top portions; and said rear frame comprising an uprightly disposed, inverted, U-shaped top portion defining a back rest, horizontally, forwardly disposed resilient portions defining arm rests, laterally outwardly and rearwardly disposed resilient leg portions, and elongated, vertically disposed straight intermediate portions, a fabric occupant-support having sleeve-like portions mounted on the last-named U-shaped portion and said arm rests, casters mounted on the free ends of the end extensions of said respective leg portions, means securing together in parallel relationship the said vertically disposed intermediate portions, and a ring-shaped anchor member surrounding one of the end extensions of one of said leg portions, and flexible strap means securing said anchor member to said leg portion.

References Cited in the file of this patent

UNITED STATES PATENTS

| | | |
|---|---|---|
| 671,058 | Resetar | Apr. 2, 1901 |
| 2,308,626 | Reinholz | Jan. 19, 1943 |
| 2,347,754 | Shay | May 2, 1944 |
| 2,509,451 | Reinholz | May 30, 1950 |
| 2,588,029 | Morris | Mar. 4, 1952 |
| 2,664,141 | Musselman | Dec. 29, 1953 |
| 2,679,282 | Anderegg | May 25, 1954 |